E. J. SCHWEIG.
SPOUT CUT-OFF.
APPLICATION FILED JULY 26, 1909.
954,891.
Patented Apr. 12, 1910.
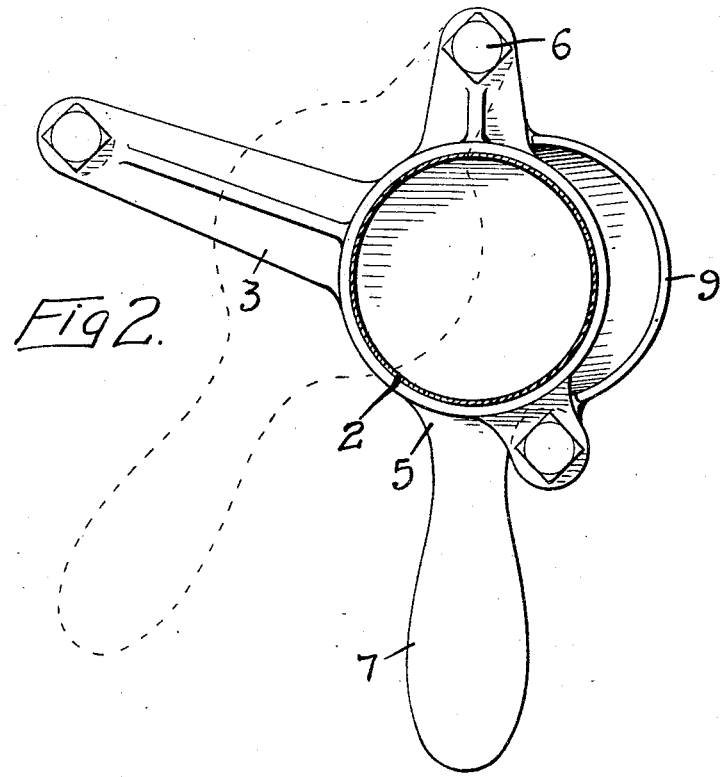
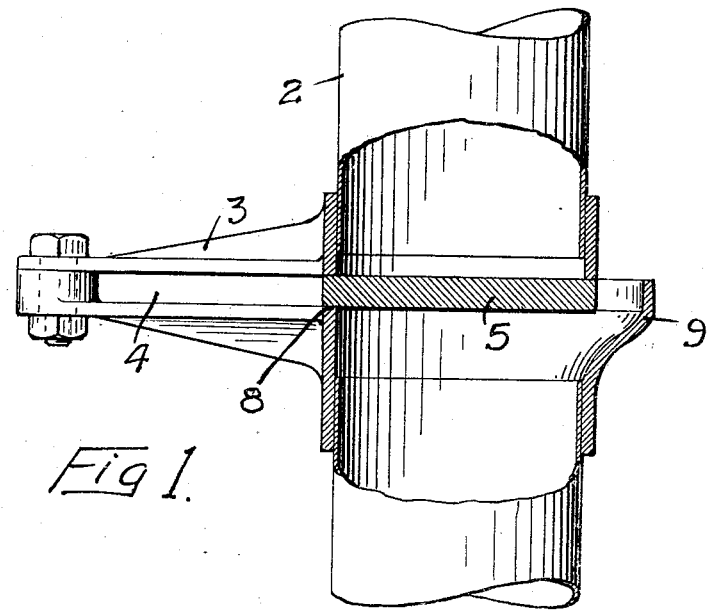
WITNESSES
INVENTOR
EDWIN J. SCHWEIG
BY Paul & Paul
ATTORNEYS

UNITED STATES PATENT OFFICE.

EDWIN J. SCHWEIG, OF MINNEAPOLIS, MINNESOTA.

SPOUT CUT-OFF.

954,891.  Specification of Letters Patent.  Patented Apr. 12, 1910.

Application filed July 26, 1909. Serial No. 509,708.

*To all whom it may concern:*

Be it known that I, EDWIN J. SCHWEIG, of Minneapolis, Hennepin county, Minnesota, have invented certain new and useful Improvements in Spout Cut-Offs, of which the following is a specification.

My invention relates to means for cutting off the flow of material through a spout and the object of the invention, is to provide means in connection with the cut-off valve to prevent the material from spilling or being pushed out of the spout by the closing valve and wasted.

My invention consists generally in a spout having a swinging cut-off or valve and means for directing the material in the path of the valve back into the spout.

In the accompanying drawings, forming part of this specification, Figure 1 is a view of a spout showing my improved cut-off mounted thereon, Fig. 2 is a transverse sectional view of the spout.

In the drawing, 2 represents a spout designed particularly for handling grain, although capable of use for other purposes, if desired.

3 is a bracket having a guideway 4 therein and 5 is a valve pivoted at 6 and having an operating handle 7 and adapted to slide in said guide way and in a slot 8, which extends transversely through the pipe. This valve is designed to cut off the flow of material through the pipe and when moved to a position cross wise of the pipe, will completely close the passage therethrough. Generally in devices of this kind, when the valve is swung to its closed position, a quantity of grain will be pushed ahead of the valve and falling outside of the pipe will be lost. To obviate this difficulty, I provide a lip or flange 9 formed by bending the wall of the pipe outwardly, so that it projects beyond the wall of the pipe section above the slot 8. When, therefore, the grain is pushed ahead of the valve, as it is moved to its closed position, it will fall upon the inclined walls of this lip and be guided thereby back into the pipe and no material will be lost during the operation of closing the valve. The expense of this lip will be trifling, but it will add materially to the efficiency of the valve as a grain cut-off. The device may be made in various forms, integral with the pipe or not, as preferred and adapted for the various sizes of spouts in which a cut-off of this kind is used.

It will be understood that this cut-off invention may be employed in spouts for various purposes where a valve of this kind is used.

I claim as my invention:—

1. The combination, with a spout having a transverse slot therein, of a valve arranged to move in said slot to open or close the passage through said spout, and a lip or flange provided on said spout beneath said slot and having an inclined wall to guide the material that is pushed ahead of said valve back into the spout.

2. The combination, with a spout, of a bracket having a guide way, said spout having a slot registering with said guide way, a valve pivoted at one end and adapted to slide in said guide way and said slot, and said spout having an outwardly flaring lip or flange beneath said slot and in front of said valve, for the purpose specified.

3. The combination, with a gravity spout having a transverse slot therein, of a valve transversely mounted with respect to said spout in said slot and arranged to shut off the passage through said spout, the wall of said spout having an opening therethrough beneath said valve, and an outwardly flaring lip for directing the material pushed ahead of said valve into said opening.

4. The combination with a spout having a slot therein, of a valve pivoted at one end and adapted to slide transversely of said spout in said slot to open or close the passage therethrough, said valve being of substantially uniform thickness from edge to edge, said spout having an opening in its wall beneath said valve, and an inwardly inclined wall beneath said opening for directing the material pushed ahead of said valve into said opening.

In witness whereof I have hereunto set my hand this 22nd day of July 1909.

EDWIN J. SCHWEIG.

Witnesses:
  J. M. SULLIVAN,
  RICHARD PAUL.